(12) United States Patent
Matuszeski et al.

(10) Patent No.: US 11,029,684 B2
(45) Date of Patent: Jun. 8, 2021

(54) SAFETY SYSTEM FOR OPERATION OF AN UNMANNED AERIAL VEHICLE

(71) Applicant: AeroVironment, Inc., Simi Valley, CA (US)

(72) Inventors: Thaddeus Benjamin Matuszeski, Pasadena, CA (US); William Arden Lott, Simi Valley, CA (US); Derek Lisoski, Simi Valley, CA (US)

(73) Assignee: AEROVIRONMENT, INC., Simi Valley, CA (US)

( * ) Notice: Subject to any disclaimer, the term of this patent is extended or adjusted under 35 U.S.C. 154(b) by 109 days.

(21) Appl. No.: 16/241,341

(22) Filed: Jan. 7, 2019

(65) Prior Publication Data

US 2019/0138001 A1    May 9, 2019

Related U.S. Application Data

(63) Continuation of application No. 15/808,783, filed on Nov. 9, 2017, now Pat. No. 10,209,707.

(60) Provisional application No. 62/421,163, filed on Nov. 11, 2016.

(51) Int. Cl.
*G05D 1/00* (2006.01)
*B64C 39/02* (2006.01)
*H04N 7/18* (2006.01)

(52) U.S. Cl.
CPC ......... *G05D 1/0055* (2013.01); *B64C 39/024* (2013.01); *G05D 1/0016* (2013.01); *B64C 2201/021* (2013.01); *B64C 2201/024* (2013.01); *B64C 2201/088* (2013.01); *B64C 2201/104* (2013.01); *B64C 2201/108* (2013.01); *B64C 2201/123* (2013.01); *B64C 2201/146* (2013.01); *B64C 2201/18* (2013.01); *H04N 7/185* (2013.01)

(58) Field of Classification Search
USPC .......................................................... 701/2
See application file for complete search history.

(56) References Cited

U.S. PATENT DOCUMENTS

| 9,412,278 | B1 | 8/2016 | Gong et al. | |
|---|---|---|---|---|
| 10,209,707 | B2 * | 2/2019 | Matuszeski | .......... G05D 1/0016 |
| 2004/0001105 | A1 | 1/2004 | Chew et al. | |
| 2006/0224280 | A1 | 10/2006 | Flanigan et al. | |

(Continued)

FOREIGN PATENT DOCUMENTS

| CN | 105549604 A | 5/2016 |
|---|---|---|
| FR | 2938774 A1 | 5/2010 |
| KR | 1020160080253 A | 7/2016 |

OTHER PUBLICATIONS

International Search Report for PCT Serial No. PCT/US2017/060945 dated Mar. 29, 2018.

*Primary Examiner* — Tyler D Paige
(74) *Attorney, Agent, or Firm* — Concept IP LLP; Pejman Yeddision; Eric Aagaard

(57) ABSTRACT

Systems, devices, and methods for a safety system including: selecting an unmanned aerial vehicle (UAV) command on a controller, the controller comprising a first processor with addressable memory; presenting a first activator and a second activator on a display of the controller for the selected UAV command, wherein the second activator is a slider; and sending the UAV command to a UAV if the first activator and the second activator are selected, the UAV comprising a second processor with addressable memory.

20 Claims, 14 Drawing Sheets

(56) References Cited

U.S. PATENT DOCUMENTS

| | | |
|---|---|---|
| 2007/0150842 A1 | 6/2007 | Chaudhri et al. |
| 2008/0114603 A1 | 5/2008 | Desrochers |
| 2010/0084513 A1 | 4/2010 | Gariepy et al. |
| 2010/0305778 A1 | 12/2010 | Dorneich et al. |
| 2011/0014983 A1 | 1/2011 | Miller |
| 2011/0288696 A1 | 11/2011 | Lefebure |
| 2012/0191269 A1 | 7/2012 | Chen et al. |
| 2012/0280087 A1 | 11/2012 | Coffman et al. |
| 2014/0217874 A1 | 8/2014 | Lin et al. |
| 2014/0249693 A1 | 9/2014 | Stark et al. |
| 2015/0158392 A1 | 6/2015 | Zhao |
| 2015/0321758 A1 | 11/2015 | Peter |
| 2015/0346722 A1 | 12/2015 | Herz et al. |
| 2015/0362917 A1 | 12/2015 | Wang et al. |
| 2016/0023755 A1 | 1/2016 | Elshafei et al. |
| 2016/0062539 A1 | 3/2016 | Moon et al. |
| 2016/0165290 A1 | 6/2016 | Szarek et al. |
| 2016/0280370 A1 | 9/2016 | Canavor et al. |
| 2016/0285864 A1 | 9/2016 | Canavor et al. |
| 2016/0306351 A1 | 10/2016 | Fisher et al. |
| 2016/0321503 A1 | 11/2016 | Zhou |
| 2016/0376004 A1* | 12/2016 | Claridge .............. B64C 27/08 701/3 |
| 2017/0061813 A1* | 3/2017 | Tao ...................... G09B 9/46 |
| 2017/0233071 A1* | 8/2017 | Pilskalns .............. G05D 1/0061 701/2 |
| 2017/0269594 A1 | 9/2017 | Sydnor |
| 2018/0068567 A1* | 3/2018 | Gong .................... G08G 5/0034 |
| 2018/0079530 A1* | 3/2018 | Wyrobek ............. B64C 39/024 |
| 2018/0143627 A1* | 5/2018 | Lee ....................... G08G 5/0013 |
| 2018/0321676 A1* | 11/2018 | Matuszeski .......... G05D 1/0055 |
| 2019/0138001 A1* | 5/2019 | Matuszeski .......... B64C 39/024 |

\* cited by examiner

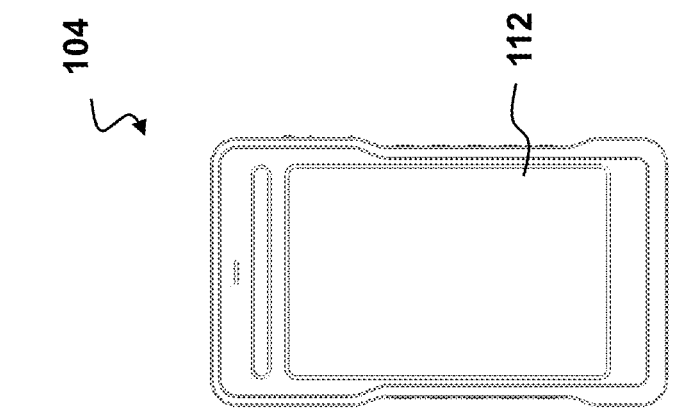
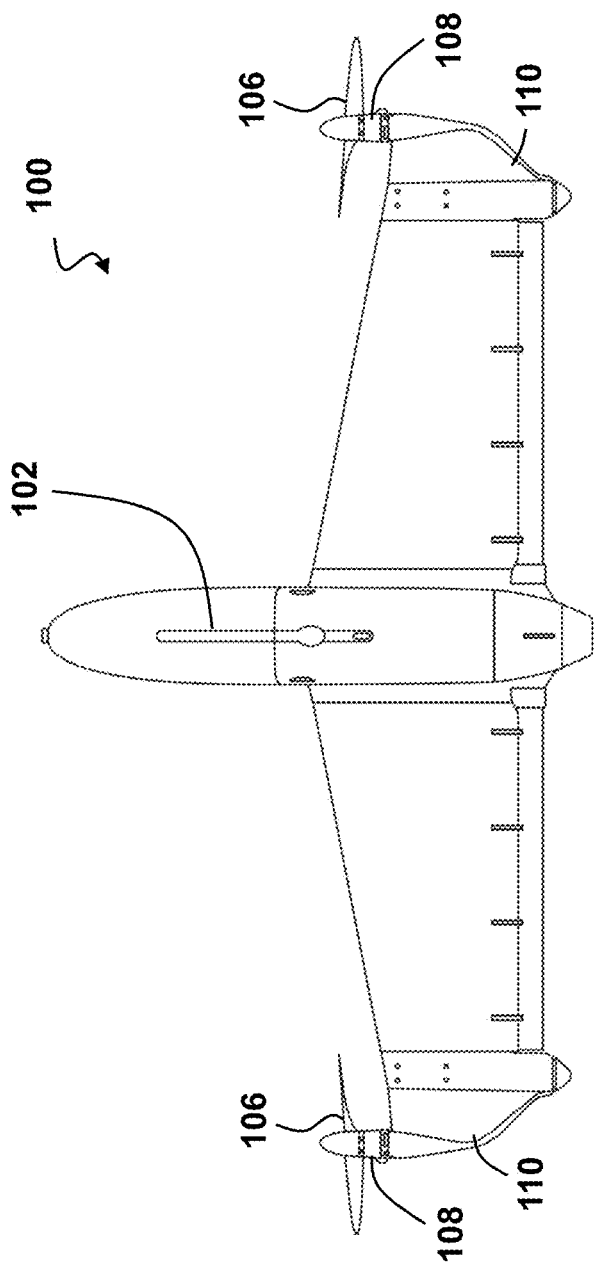
FIG. 1B
FIG. 1A

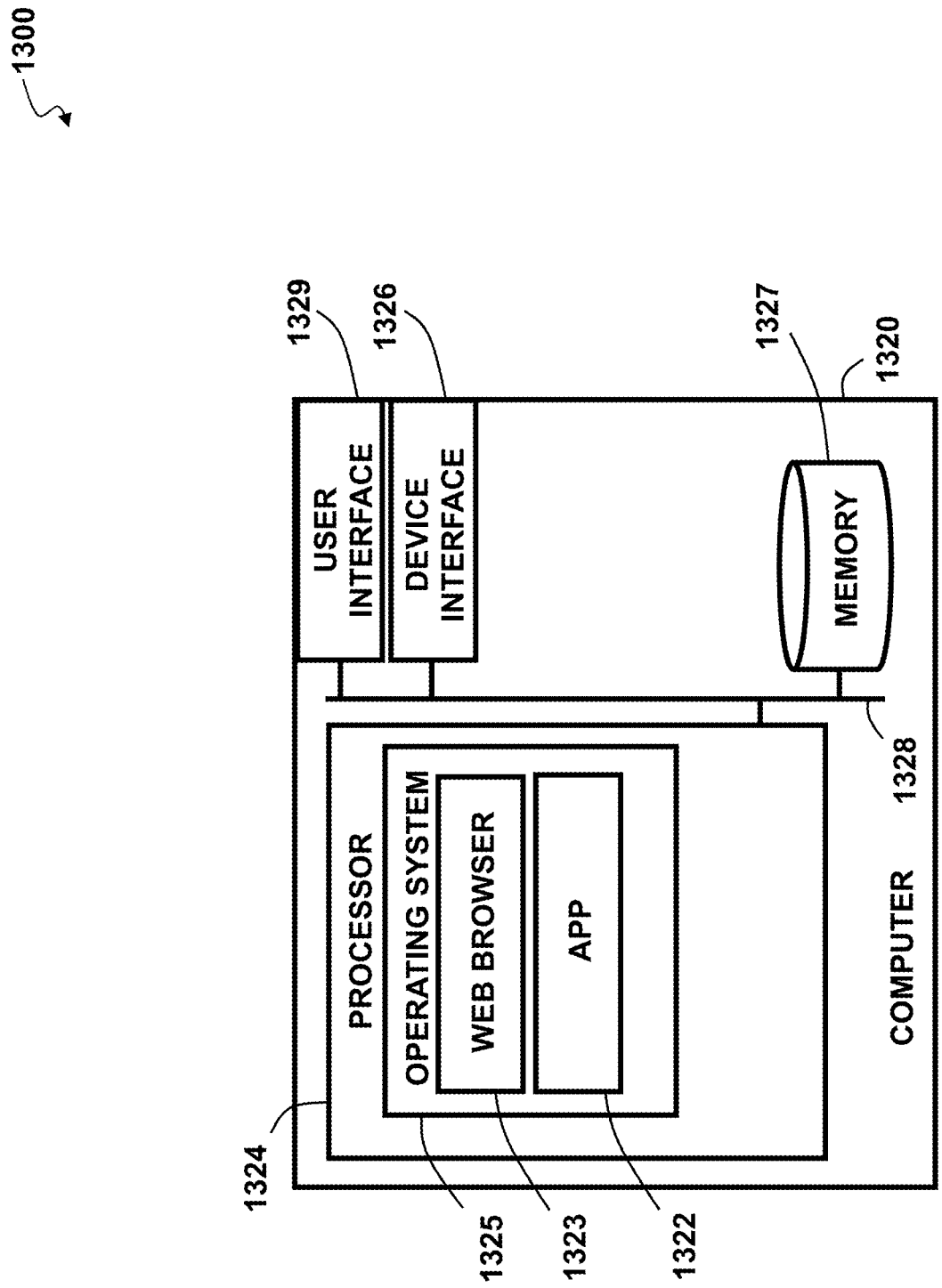

SAFETY SYSTEM FOR OPERATION OF AN UNMANNED AERIAL VEHICLE

CROSS-REFERENCE TO RELATED APPLICATIONS

This application is a continuation of U.S. Non-provisional patent application Ser. No. 15/808,783, filed Nov. 9, 2017, which claims priority to and the benefit of U.S. Provisional Patent Application No. 62/421,163, filed Nov. 11, 2016, the contents of all of which are hereby incorporated by reference herein for all purposes.

TECHNICAL FIELD

Embodiments relate generally to unmanned aerial vehicles (UAVs), and more particularly to safety systems for UAVs.

BACKGROUND

One specific danger that may occur during operation of the UAV systems is the unintentional, inadvertent, or accidental start and/or termination of flight of the UAV. An accidental initiation of flight can easily result in injury to persons in the immediate area around the UAV, especially since certain close-up tasks may need to be performed before flight, e.g., payload placement, propeller inspection, propeller replacement, storage media loading, storage media retrieval, battery placement, and battery charging. Likewise, such unintended operation can damage the UAV or surrounding property. In a similar manner, an undesired termination of flight could result in loss or damage to the UAV or a delayed and inefficient operation. Having a controller with a single button to control such operations tends to lend itself to accidental commands occurring.

SUMMARY

An exemplary method embodiment may include: selecting an unmanned aerial vehicle (UAV) command on a controller, the controller comprising a first processor with addressable memory; presenting a first activator and a second activator on a display of the controller for the selected UAV command, where the second activator is a slider; and sending the UAV command to a UAV if the first activator and the second activator are selected, the UAV comprising a second processor with addressable memory. Additional method embodiments may include: receiving, by the UAV, the UAV command; and executing the received UAV command on the UAV. The UAV command may be sent if the first activator is selected prior to the selection of the second activator. The UAV command may be sent if the first activator is selected concurrent with the selection of the second activator. Selecting the first activator may further include: maintaining selection of the first activator while the second activator is selected.

In some method embodiments, the selected UAV command may be a launch command, where the first activator may be a button, where the second activator may be a vertical slider, and where selecting the second activator may include sliding a button in an upward direction in the slider relative to a display of the controller. Additional method embodiments may include: determining, by the controller, a remaining flight time based on a battery state of charge needed by the UAV to return to and land at a launch location; and presenting the remaining flight time on the display of the controller. Additional method embodiments may include: determining, by the controller, a position of the UAV relative to the controller; and presenting a wayfinder on the display of the controller, wherein the wayfinder is oriented toward the position of the UAV.

In some method embodiments, the selected UAV command may be a return and land command, where the first activator may be a button, where the second activator may be a horizontal slider, and wherein selecting the second activator comprises sliding a button horizontally in the slider relative to a display of the controller. The return and land command may direct the UAV to land at a location it launched from.

In some method embodiments, the selected UAV command may be a land now command, where the first activator may be a button, where the second activator may be a vertical slider, and where selecting the second activator may include sliding a button in a downward direction in the slider relative to a display of the controller. The land now command may direct the UAV to land at a location proximate to a geographical position of the UAV when the UAV receives the land now command. In some method embodiments, the selected UAV command may be an emergency stop command, where the first activator may be a button, where the second activator may be a vertical slider, and where selecting the second activator may include sliding a button in a downward direction in the slider relative to a display of the controller. The emergency stop command may direct the UAV to stop at least one motor of the UAV.

Additional exemplary method embodiments may include: determining, by a processor of an unmanned aerial vehicle (UAV), a remaining battery state of charge needed by the UAV to return to and land at a launch location; and commanding, by the processor of the UAV, the UAV to return to and land on the launch location if the determined remaining battery state of charge is within a set limit. The method may further include: commanding, by the processor of the UAV, the UAV to land now at the UAV current location if the determined remaining battery state of charge is under a set limit for returning and landing at the launch location. The method may further include: determining, by the processor of the UAV, if a fault condition has occurred; and commanding, by the processor of the UAV, the UAV to at least one of: return to and land on the launch location and land now at the UAV current location.

Exemplary system embodiments may include: an unmanned aerial vehicle (UAV) having a processor and addressable memory; the processor configured to: determine a UAV command based on a set of status information of the UAV, where the set of status information may be received from at least one sensor associated with the UAV; transmit the determined command to a controller for confirmation; and a controller having a processor and addressable memory, where the controller may be configured to: receive a transmitted UAV command from the UAV; present a first activator and a second activator on a display of the controller for the selected UAV command, where the second activator is a slider; confirm that the first activator and the second activator are executed successfully; and send the UAV command confirmation to the UAV for execution at the UAV of the command; where the UAV may execute the UAV command based on receiving the confirmation. In additional system embodiments, the UAV command may be at least one of: a return and land command, a land now command, and an emergency stop command.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIG. 1A depicts an exemplary autonomous vertical take-off and landing (VTOL) unmanned aerial vehicle (UAV) with a set of indicators positioned on an exterior of the UAV;

FIG. 1B depicts an exemplary controller for operating the UAV of FIG. 1A from a distance;

FIG. 8A depicts a display screen for the controller of FIG. 1B for returning the UAV of FIG. 1A to where it departed from;

FIG. 8B depicts a user interacting with the screen of FIG. 8A to land the UAV of FIG. 1A to where it departed from;

FIG. 13 illustrates an exemplary top level functional block diagram of a computing device embodiment of a safety system.

DETAILED DESCRIPTION

Figure 1C:
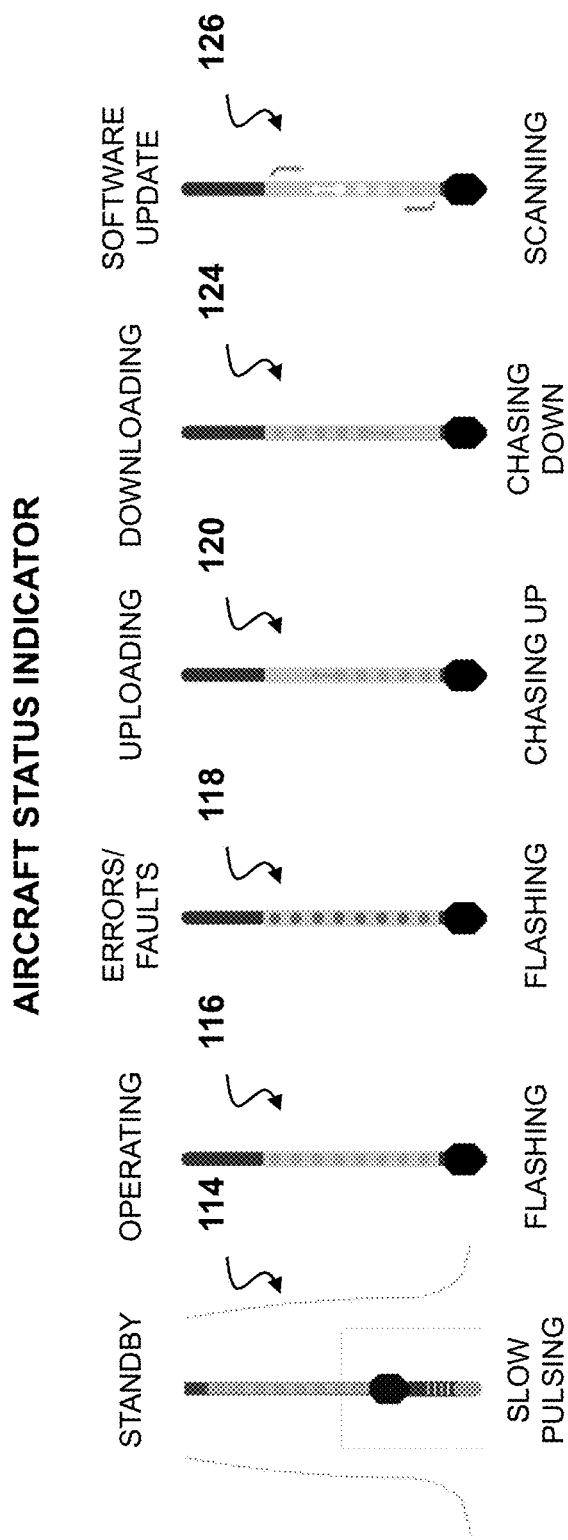
FIG. 1C depicts indicator lights for the UAV of FIG. 1A during various operating conditions.

The present system allows for a safety system for operating an unmanned aerial vehicle (UAV) that requires at least two unique and independent actions to launch the UAV, return to land from where the UAV launched, land the UAV at its current location, and effect an emergency stop of the UAV at its current location. As UAVs have become more commercially available they are more likely to be operated by relatively unskilled users and in potentially less than ideal situations and conditions. The disclosed system comprising built-in safe-guards, may provide an acceptable level of usability by simplifying the user's operation and interface, while doing so in a sufficiently safe and intuitive manner. Additionally, the system may provide an environment where the UAV may automatically execute certain actions based on data received by the safety system.

The disclosed safety system for the operation of an automatic or autonomous flying UAV is configured to prevent or limit unintended activation of a critical action, such as the initiation and/or termination of flight operations of the UAV. This is achieved by the system requiring that the user to manipulate or operate more than one separate activator before the desired event or action commences. In some embodiments, at least one of these activators may be a slider or swiping bar. In other embodiments, the safety system may initiate a set of actions without user interaction in order to preserve the safest outcome possible given the circumstances.

In some embodiments, the initiation of flight may include the vertical take-off of a UAV. Similarly, the termination of flight may include a vertical landing either at, or near, the original take-off location. This landing maneuver may be referred to as a return to home (RTH), return home, return to launch, or return to base (RTB) termination. The UAV may also land at a location relatively near the UAV's flight position upon termination of flight. This landing maneuver may be referred to as a land now, land immediate, or land immediately termination, which may be useful in emergency situations. A more severe example of the termination of flight may be an emergency stop command that stops all propulsion of the aircraft. This final action would only be used in a more extreme safety event, e.g., a tumbling out-of-control aircraft or unintended controlled flight into terrain.

FIG. 1A depicts an exemplary autonomous vertical take-off and landing (VTOL) unmanned aerial vehicle (UAV) 100 with a set of indicators 102, e.g., a light bar, positioned on an exterior of the UAV. FIG. 1B depicts an exemplary controller 104 for operating the UAV 100 of FIG. 1A from a distance. The UAV 100 may have a set of propellers or rotors 106 with motors 108 in motor pods 110 positioned upward at the wingtips. In some embodiments, there may be four rotors and corresponding motor pods with two of them unseen and positioned directly behind those shown, such that there is a pair on either side of each wing tip to provide a quad-rotor configuration. The UAV may have a processor with addressable memory to control one or more functions of the UAV, receive commands from the controller 104 via a receiver or transceiver, and send data to the controller 104 or other devices via a transmitter or receiver.

The disclosed system may include warnings, such as indicators 102, for those persons in or near the area of operation and an ability to monitor the aircraft state and terminate flight via the controller 104 if such state exceeds one or more defined limitations. The indicators 102 may include operation of one or more warning lights, such as a set of flashing lights, the operation of warning siren or other noise maker, and/or an initial slow turning of the rotors 106 of the UAV 100. Different color lights may be used to indicate readiness of the UAV, e.g., green light for go and red lights for no go. Green flashing lights may indicate go, but with caution because launch is commencing. Red flashing light may indicate a warning and no go. The indicators 102 may turn off while imaging in horizontal flight to ensure accuracy of any sensors used on the UAV.

The UAV 100 may include a UAV state monitor that may include the use of any of a variety of sensors, such as a gyroscope, an accelerometer, a pressure sensors, an Inertial Measurement Unit (IMU), an Inertial Navigation System (INS), a compass, a global positioning satellite (GPS) unit, an optical sensor, a radar, a sonic sensor, and a battery state-of-charge sensor. The measurements from these sensors may be tracked and compared by the UAV's processor against a set of limits or other values to determine if the UAV is properly positioned to maintain and continue the flight. In the event that the UAV state monitor determines that the UAV has, or is going to, surpass a set of defined limits, then the UAV processor may terminate the flight to maintain or maximize safe operations. Additionally, the UAV processor may execute a set of actions dynamically based on data received from the UAV state monitor with or without a connecting to the system controller 104.

The system controller 104 may have a display or screen 112 for operating the UAV 100 from a distance. The controller 104 may include a controller processor, addressable memory, and transmitters/receivers for establishing a connection via a communication channel. The display 112 may be a flat panel touch screen that projects variable control activators, e.g., graphic buttons, switches, knobs, and sliders, to control the operation of the UAV 100. The controller processor may convert the user inputs to commands to be sent by the communication channel, e.g., a wired or wireless connection to the UAV 100 and provide a graphical display of the operation of the UAV 100, such as images transmitted by the UAV 100 and/or other operational information. The controller 104 may be handheld and may include any of a variety of position sensors such as gyroscopes and accelerometers and cameras. While a tablet is shown, other computing devices may be used in its place, such as a smartphone, a laptop, desktop, etc.

FIG. 1C depicts a set of indicator lights for the UAV of FIG. 1A during various operating conditions. In one embodiment, in standby mode, the lights may have a slow pulsing or breathing sequence 114 to indicate that the UAV is ready for flight but is not yet operating. During operating mode, the lights may flash green 116. If an error or fault occurs, the lights may flash red 118. During uploading, the lights may chase up 120. During downloading, the lights may chase down 124. During a software update, the lights may scan 126. The various colors and patterns of the indicator lights may provide and convey visual confirmation to a user of the UAV, status from a safe operating distance. For example, if the lights transition from slow pulsing 114 to flashing green 116, the user is alerted that the UAV may be in startup mode and indicating that the user has time to move a safe distance from the UAV. If the UAV lands with flashing red lights 118, the user is alerted that an error or fault has occurred and may proceed with diagnostics to determine the problem prior to a next flight of the UAV.

Figure 2:
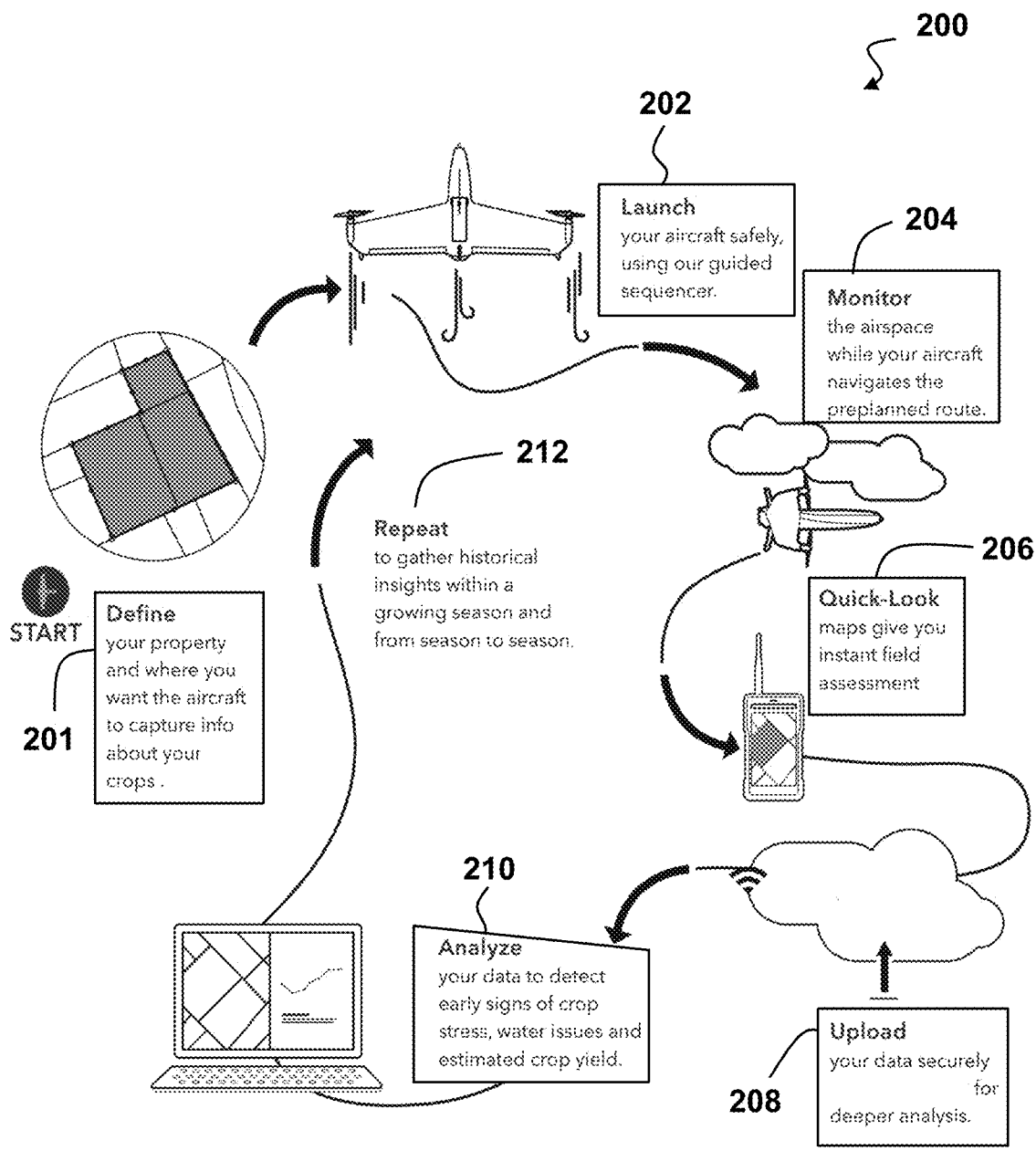
FIG. 2 depicts exemplary operational steps of a system utilizing the UAV and controller of FIGS. 1A-1B.
Figure 4A:
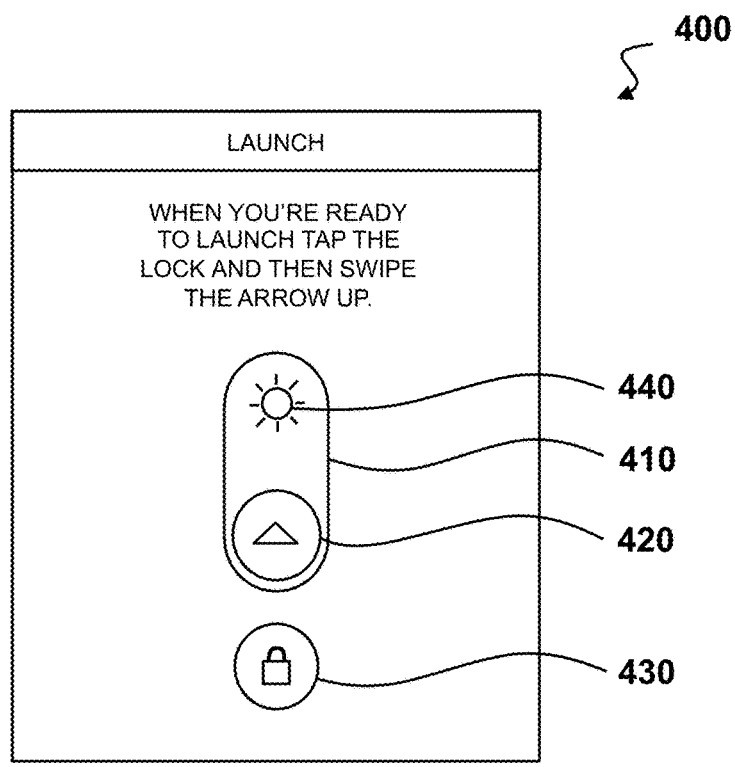
FIG. 4A depicts a display screen for the controller of FIG. 1B for launching the UAV of FIG. 1A.
Figure 4B:
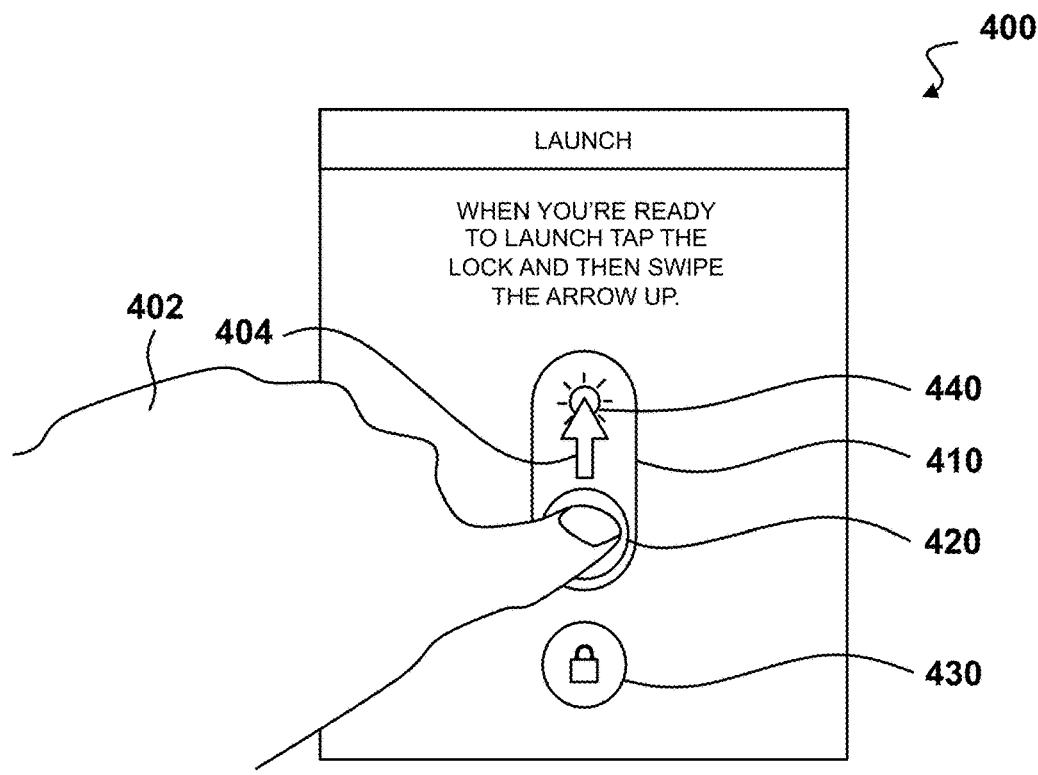
FIG. 4B depicts a user interacting with the screen of FIG. 4A to launch the UAV of FIG. 1A.
Figure 5:
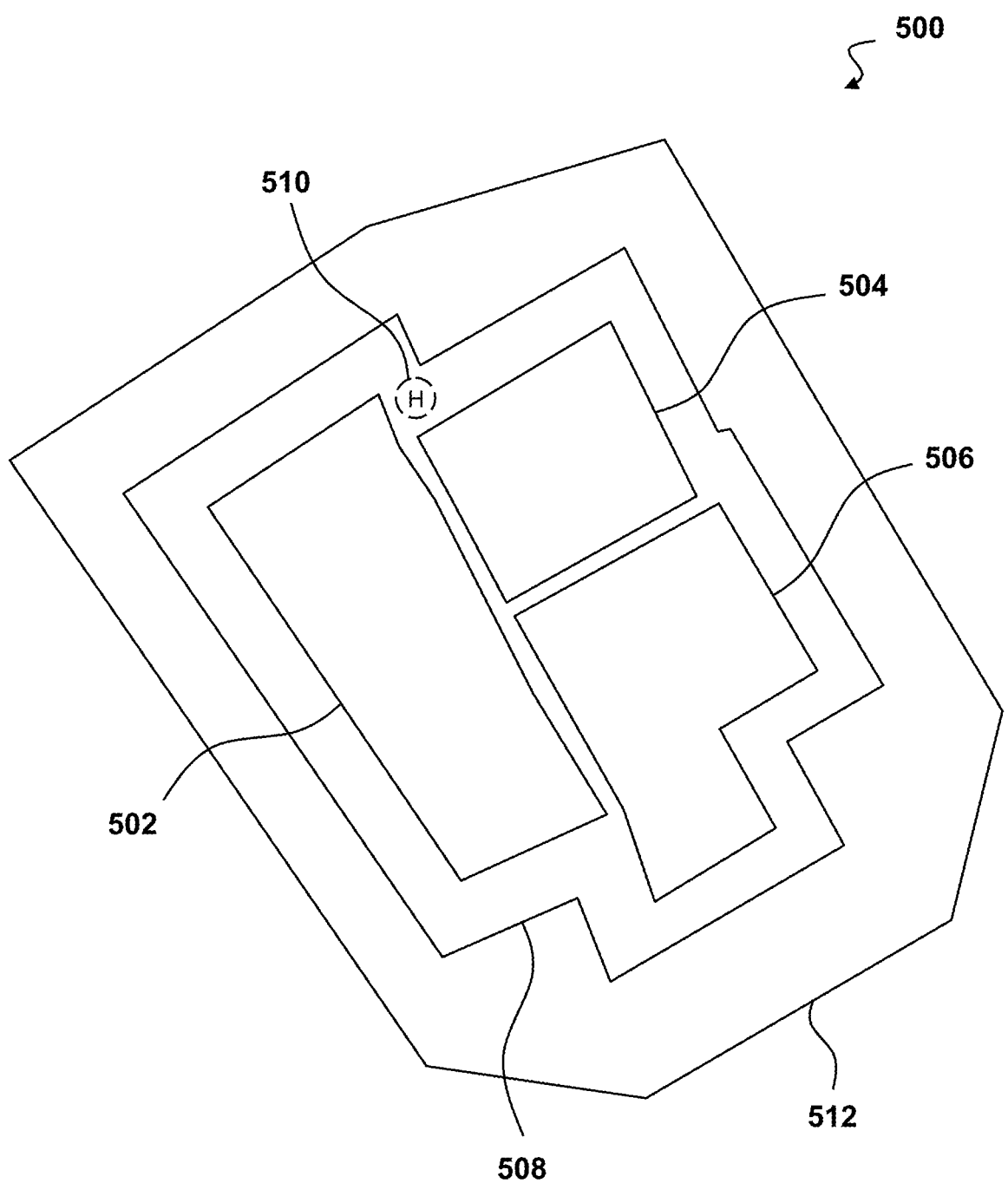
FIG. 5 depicts a map of an area selected by a user prior to launching the UAV.

FIG. 2 depicts exemplary operational steps of a system 200 utilizing the UAV and controller of FIGS. 1A-1B. In this embodiment, the user may start by defining 201 an area to be observed by the UAV, as shown in FIG. 5. In an agricultural setting, this may involve defining a property where the UAV by way of a flight path may capture information about crops. The user may launch 202 the UAV via a vertical take-off method. The user may use a guided sequencer, such as shown in FIGS. 4A-4B, to safely launch the UAV and prevent any accidental launches. The user may then monitor 204 the airspace while the UAV navigates a preplanned route. The user may be required to maintain constant line of sight with the UAV while it is in the air. The user may then land the UAV via a vertical landing from the original location or near where the UAV was located when commanded to land. The user may have a quick-look assessment 206, via the controller, shown in FIG. 1B. The assessment 206 may provide a view of maps once the UAV has landed. The user may upload 208 the data from the UAV to a local drive, cloud system, or other database for further analysis. The upload 208 may be done wirelessly, wired, or by removing a memory store, such as an SD-card located on the UAV.

In some embodiments, the user may conduct further analysis 210 of the data, where the UAV is used in agriculture, for example, the analysis 210 may be used to detect early signs of crop stress, water issues, and/or estimated crop yield. The user may then repeat 212 the process. Repeated flights and gathered data may be used to provide historical insights. In an agricultural use, these insights may be used within an individual growing season and from season to season. The data analysis may be done on the user device, such as the controller of FIG. 1B, a user computing device, and/or a remote cloud system.

Figure 3:
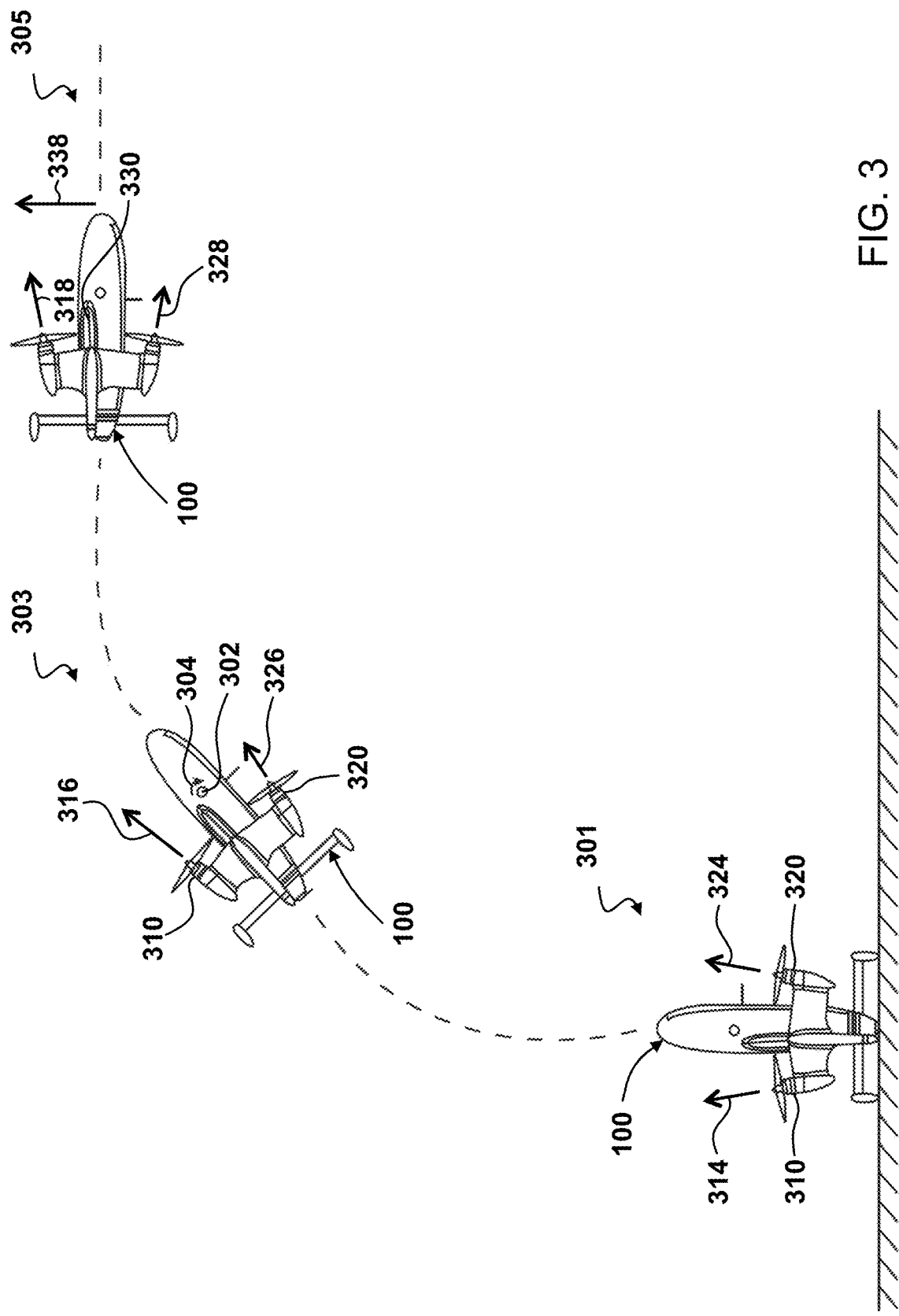
FIG. 3 depicts a vertical take-off and transition to horizontal flight of the exemplary VTOL UAV of FIG. 1A.

FIG. 3 depicts a vertical take-off and transition to horizontal flight of the exemplary VTOL UAV 100 of FIG. 1A. The UAV 100 may transition from vertical flight to horizontal flight by varying the thrust produced by its motors. The UAV 100 is in a first position 301 on the ground ready for vertical take-off. An on-board controller having a processor and addressable memory may send a signal to the motors to produce thrust needed for vertical take-off and subsequent adjustments to thrust during flight. Flight control may be autonomous, pre-programmed, and/or controlled by an external user at a ground control system. Top motors 310 create top thrust 314, and bottom motors 320 create bottom thrust 324. During vertical take-off, the top thrust 314 and bottom thrust 324 may be substantially equal. The top thrust 314 and the bottom thrust 324 are depicted as angled based on the angles of the respective motors 310, 320 to have both a vertical and a lateral component.

The figure further depicts the UAV 100 in a second position 303, where the UAV may be transitioning from vertical flight to horizontal flight. The UAV 100 pitches forward by increasing a top thrust 316 produced by the top motor 310 and decreasing a bottom thrust 326 produced by the bottom motor 320. This thrust differential produces a net moment 304 about a center of mass 302 of the UAV 100, which causes the UAV 100 to pitch forward. The UAV 100 is in a third position 305 in forward horizontal flight. A wing lift 338 is carrying the weight of the UAV 100. As the top thrust 318 and bottom thrust 328 are adjusted, the UAV 100 may be pitched up or down. Adjusting thrust to the motors on the opposing end of a wing 330 of the UAV 100 may allow the UAV 100 to be yawed left or right by differential thrust between the right and left sides. In embodiments of the safety system, an action may be executed at any of these stages of flight and may be executed by a user at the controller (FIG. 1B, 104) or the processor of the UAV.

FIG. 4A depicts a visual display screen 400 for the controller of FIG. 1B for launching the UAV of FIG. 1A. The display screen may also be used on an auxiliary device, second controller, or any number of mirrored displays. The screen 400 may include a launch activator or button 420 positioned in a slider 410 along with a lock activator or button 430. In order to prevent or limit unintended launch of the UAV, e.g., by an accidental press of a single launch button when handling or storing the controller, the system may require that the lock button 430 be activated, i.e., pressed, simultaneously with, or sequentially with, the sliding of the launch button 420 through, or at least substantially through, the length of the slider 410. The required dual action with simultaneous sliding of the button 420 further reduces the potential for an unintended activation. Moving the button 420 by itself and without pressing the lock button at the same time will not activate the launch of the UAV. In some embodiments, the button 420 may or may not move without the lock button being activated. Accordingly, a launch may not be initiated without the depression of the lock button 430. In some embodiments, the lock button 430 may be configured to retain its unlocked position after being pressed until the launch button 420 is activated, which may allow for a single finger or non-simultaneous operation of the buttons 420, 430. The screen may include an indicator 440 for the final position of the button 420 in the slider 410. The movement of the button 420 in the slider 410 mirrors the action of the UAV, i.e., the UAV is moving upward in a vertical launch as the button 420 is moving upward in the slider. This mirroring of the action ensures that the user does not utilize an incorrect screen.

FIG. 4B depicts a user 402 interacting with the screen 400 of FIG. 4A to launch the UAV of FIG. 1A. The user 402 slides the launch button 420 in the slider 410. In some embodiments, the user 402 may need to concurrently depress the lock button 430 at the same time or have pressed the lock button 430 before sliding the launch button 420. An indicator 404, such as an arrow, may appear once the user presses the launch button 420 to indicate the direction to slide the launch button 420 in the slider 410 to launch the UAV. The launch slider 420 may be arranged in a vertical orientation, relative to the screen or display 400. This provides the user 402 with a more intuitive action, namely, to launch the UAV in a vertical take-off direction where the user is moving the launch button 420 upwards. In some embodiments, this intuitive operation may be enhanced by the addition of a graphic in or about the slider indicating the sky, or otherwise, such as an image of the sun as an indicator 440 that the user moves the launch button 420 over.

FIG. 5 depicts a map 500 of an area selected by a user prior to launching the UAV. The user may have one or more areas of interest 502, 504, 506, such as fields of crops. The user may define a flight area 508 surrounding the one or more areas of interest 502, 504, 506. The larger flight area 508 accommodates the launch location of the UAV 510 and the need of the UAV to maneuver about the areas of interest 502, 504, 506. A keep in zone 512 may be set by the user that surrounds the flight area 508. The keep in zone 512 may be a property boundary or border identifying a restricted area that the UAV is not allowed to fly over. If the UAV crosses the keep in zone 512 boundary, the UAV may effect an automatic emergency stop, land now, or return & land command based on user and/or system settings.

Figure 6:
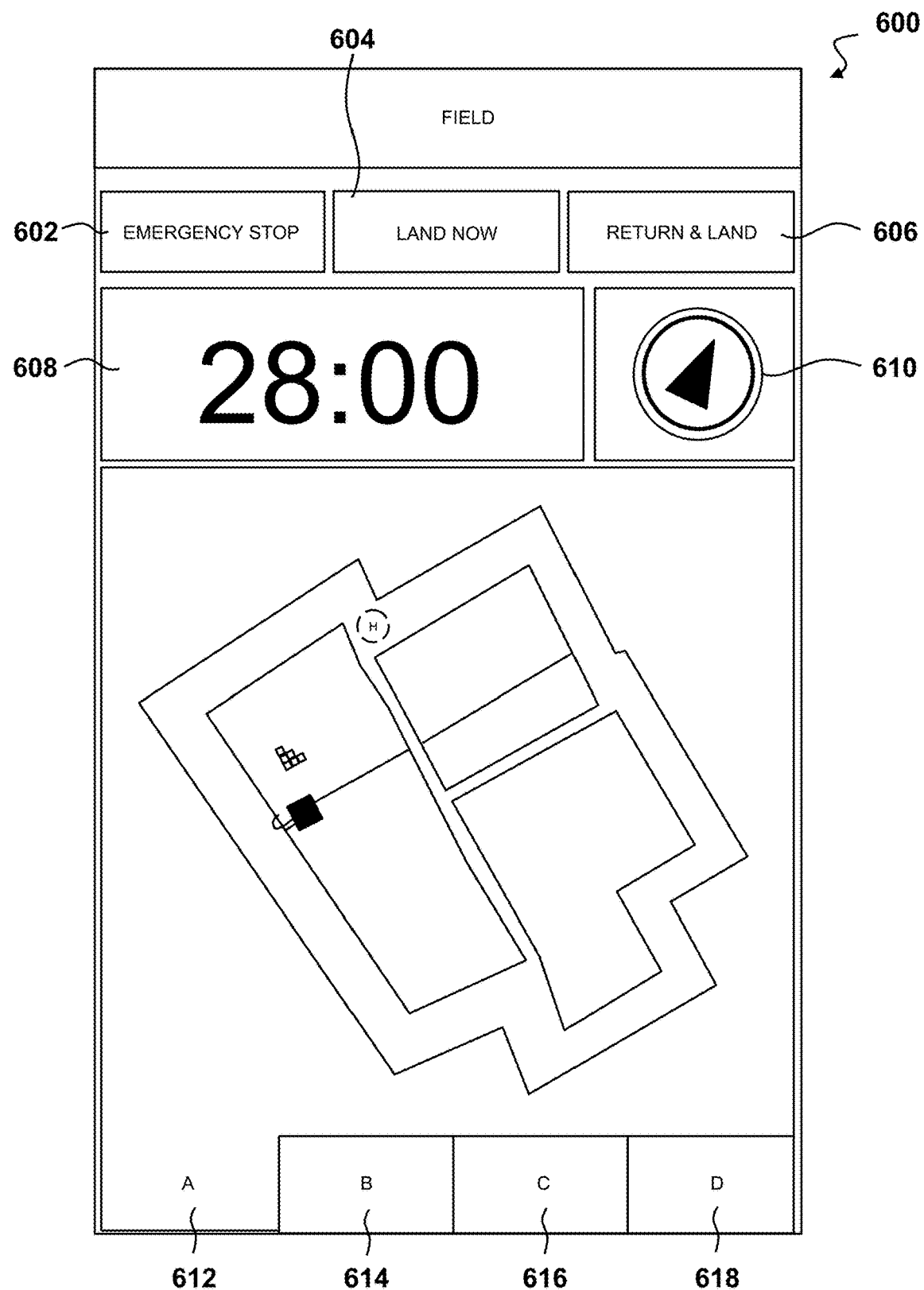
FIG. 6 depicts a display screen for the controller of FIG. 1B for a flight operation screen.

FIG. 6 depicts a visual display screen for the controller of FIG. 1B for a flight operation screen 600. The operation screen 600 is the mission or flight operation screen for the user. In some embodiments, the screen 600 may be the next screen displayed to the user immediately after activation of the launch is complete, as in FIGS. 4A-4B. The screen 600 is an operation screen as it shows the progress of the UAV after launch and during a flight or mission, and will be the user's interface for the duration of the flight, if and until the UAV is commanded to land, has landed, or the operation of the UAV is otherwise terminated. The screen 600 may include three tabs or buttons at or near the top of the display.

Figure 8A:
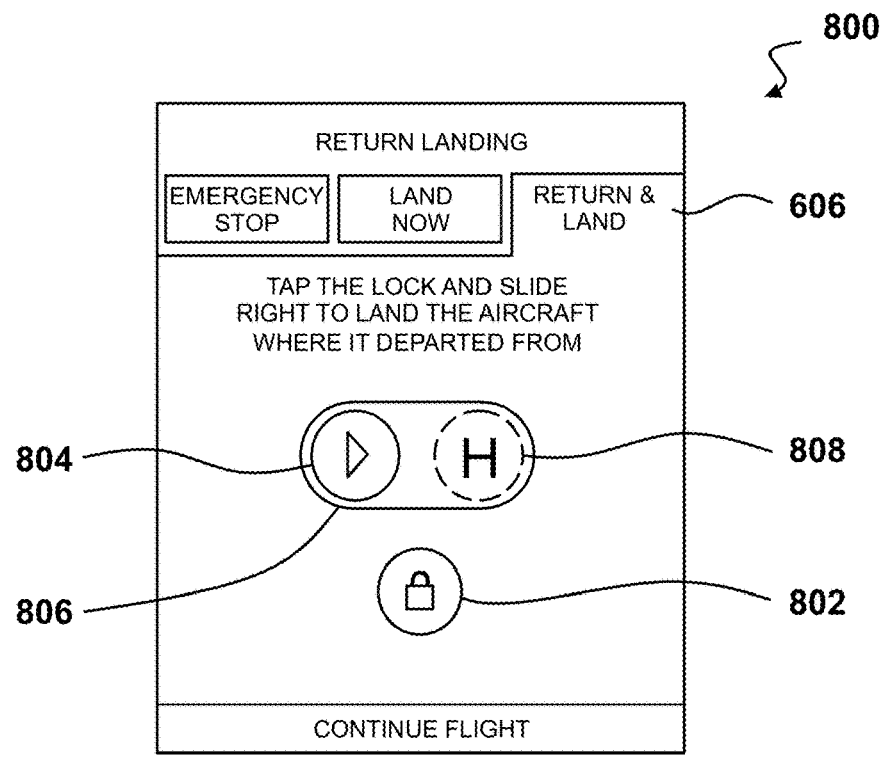
Figure 8B:
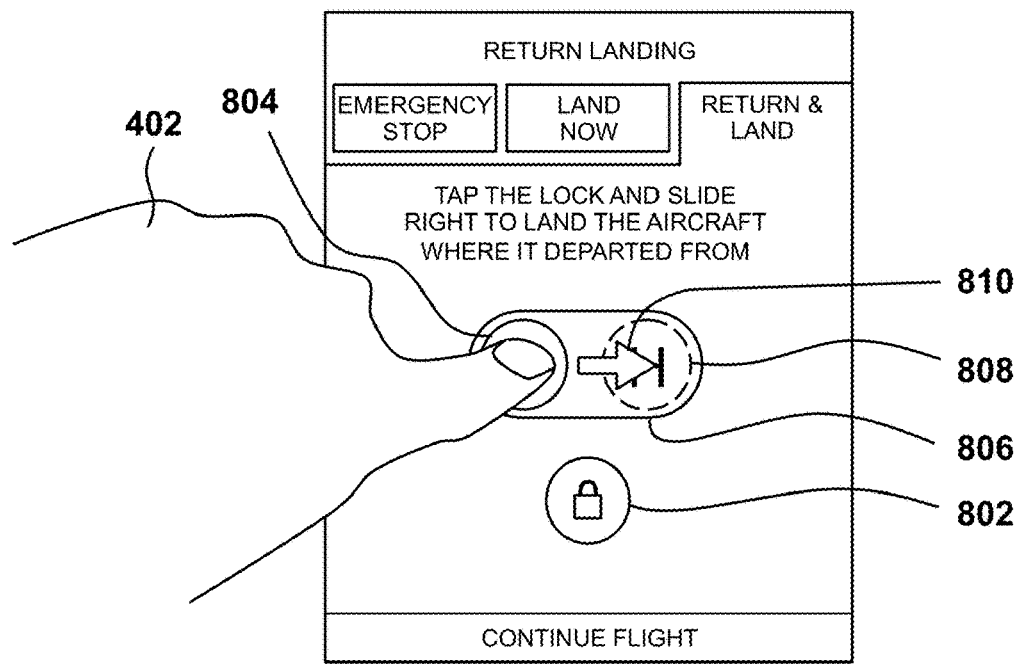
Figure 9A:
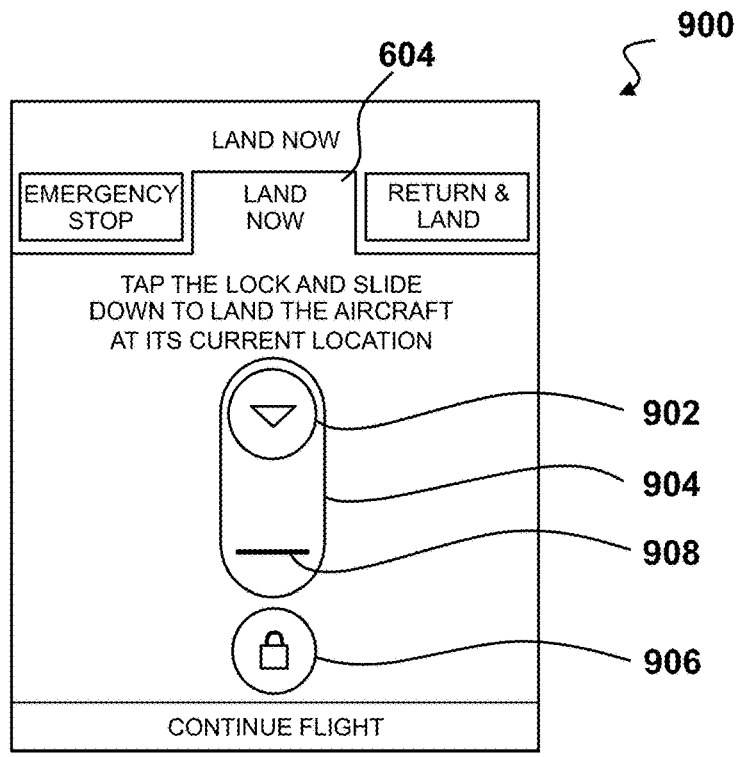
FIG. 9A depicts a display screen for the controller of FIG. 1B for landing the UAV of FIG. 1A at its current location.
Figure 9B:
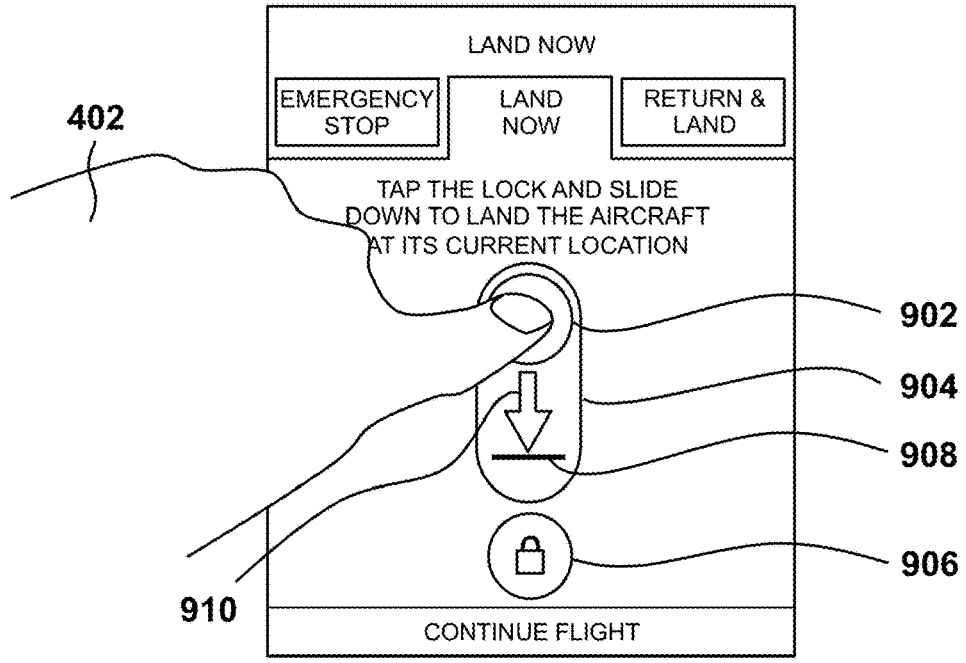
FIG. 9B depicts a user interacting with the screen of FIG. 9A to land the UAV of FIG. 1A at its current location.
Figure 10A:
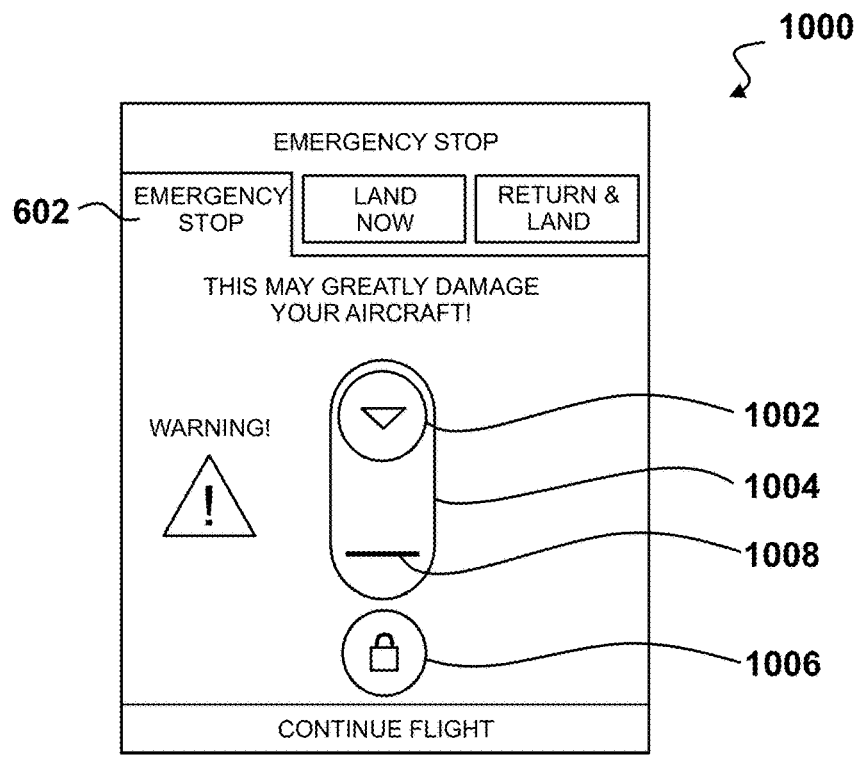
FIG. 10A depicts a display screen for the controller of FIG. 1B for effecting an emergency stop of the UAV of FIG. 1A.
Figure 10B:
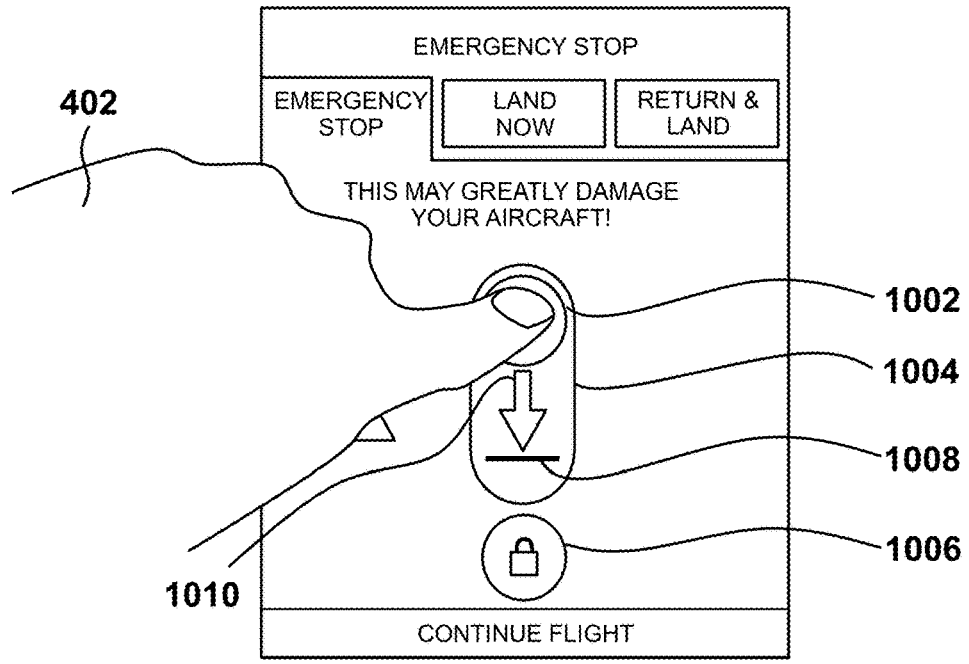
FIG. 10B depicts a user interacting with the screen of FIG. 10A to effect the emergency stop of the UAV of FIG. 1A.

In one embodiment, a tab may be used as an emergency stop tab 602, which when activated or pressed will take the user to an emergency stop screen, an embodiment of which is shown in FIGS. 10A-10B. Another tab is a land now tab 604, which when activated or pressed will take the user to a land now screen, an embodiment of which is shown in FIGS. 9A-9B. A third tab is a return & land tab 606, which when activated or pressed will take the user to a return and land screen, an embodiment of which is shown in FIGS. 8A-8B.

The screen 600 may display a time indicator 608, which may display flight time remaining until the UAV has to land. In one embodiment, the time indicator 608 may be based on a battery state of charge, a predetermined flight path, etc. The time indicator 608 may be updated if the UAV is encountering conditions that increase the flight time such as a strong headwind. In some embodiments, the time to land may be limited to a specified time period.

The screen 600 may also include a wayfinder 610. The wayfinder 610 may point in the direction of the UAV relative to the controller. While the operator of the UAV should maintain constant line of sight, when in the air, the wayfinder 610 provides security in case the operator temporarily loses track of the UAV in their line of sign. The wayfinder 610 may also be used to locate the UAV in the event of a land now command. The wayfinder 610 may be most accurate when the controller is held parallel to the ground. In some embodiments, the wayfinder 610 may use a combination of the UAV location and an orientation of the controller to determine the direction of the indicator of the wayfinder 610.

The screen 600 may have one or more tabs 612, 614, 616, 618 to access one or more features of the system. For example, the user may use these tabs 612, 614, 616, 618 to switch between a map view, an annotation view allowing the user to annotate the map view, a gallery including one or more pictures, videos, or data captured by the UAV, and additional information such as a user guide or tips.

Figure 7:
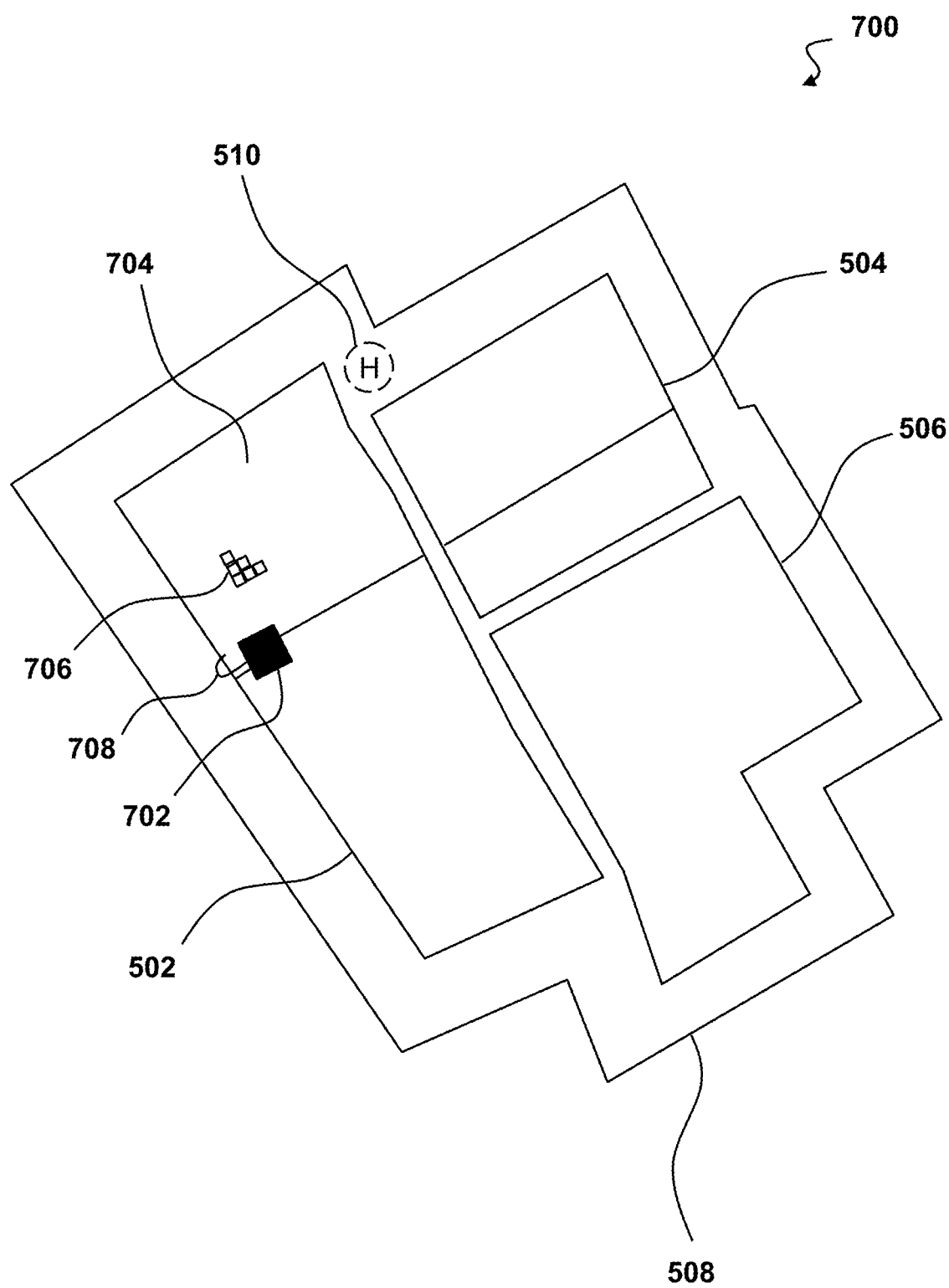
FIG. 7 depicts a detailed view of the flight operation screen of FIG. 6.

FIG. 7 depicts a detailed view 700 of the flight operation screen of FIG. 6. The progress of the flight or mission of the UAV may be displayed in a stylized manner. Additionally, an icon showing the UAV 702, various land segment icons 704, 706, survey boundaries 502, 504, 506, and a landing or home location 510 may be displayed. The UAV icon 702 may be a representation of the aircraft, such as the UAV 100 set forth in FIG. 1 and further discussed in detail herein. The UAV icon 702 shows the relatively current position of the aircraft, which may be based on location data sent in real time, or near real time, wirelessly from the UAV to the controller. As the UAV performs its mission, the icon 702 moves 708 as indicated by a line about the screen, typically in a back and forth or switching back manner.

The land segment icons 704, 706, show defined segments of land with a representative value based on the data collected by the UAV. Specifically, the UAV may send back to the controller in real time, or near real time, data defining the four geographic corners of each land segment and value summarizing, averaging, or otherwise generalizing, the sensor data received from surveying or observing that portion of land. For example, segments 704 may be displayed as a green block indicating generally the conditions of that segment of land are in good condition, or healthy, such as sufficiently watered crops. Segments 706 may be displayed as red or yellow blocks indicating generally that the conditions of that segment of land are unhealthy or otherwise not desired, such as crops that are too dry and need additional water.

The survey boundary 502, 504, 506 lines indicate where the UAV will perform its scanning operations broken down into individual segments, such as segments 704, 706. The survey boundaries may be determined prior to flight during the user's mission planning either by using a controller, such as controller 120 and/or through an online portal, as in FIG. 5. The surrounding polygons around the survey boundaries indicate the airspace 508 required for the UAV to turn around between scanning passes. This surrounding area 508 is therefore part of an overfly zone but is not imaged or scanned.

The flight operations of the UAV may conclude when the UAV has covered and obtained data on all of the land within survey boundary 502, 504, 506. The UAV will then return to the landing location 510. Any of the three contingency actions disclosed herein may conclude the flight earlier than planned, such as, if an error or fault has occurred.

FIG. 8A depicts a visual display screen 800 for the controller of FIG. 1B for returning the UAV of FIG. 1A to where it departed from. The action of activating the tab 606 for return & land is the first step of a multiple-step process to terminate the flight from the mission or flight operation screen of FIG. 6.

Display screen or window 800 is displayed to a user on the controller of FIG. 1B or similar device. In some embodiments, the screen 800 may be the next screen displayed to the user immediately after activation of the return & land tab 606 on the flight operation screen of FIG. 6. The screen 800 may comprise a lock button 802 that must be pressed or held concurrently with a return and land activator or button 804 positioned in a slider 806. In order to prevent or limit unintended return and landing of the UAV, such as by an accidental press of a single land button when handling or storing the controller, the system may require the sliding of the return and land button 804 through, or at least substantially through, the length of the slider 806. The required sliding of the button 804 further reduces the potential for an unintended activation. As such, for the user to initiate a return and land operation of the UAV from the UAV's mission or operation, the user may have to perform a multi-step operation. For example, a three-step operation of first activating the return & land tab 606, pressing or holding the lock button 802, and then on screen 800 sliding the button 804 through the slider 806.

The arrangement of the return and land slider 806 in a horizontal orientation, relative to the screen or display 800, may provide a more intuitive application, namely to return and land the UAV the user would be moving the button 806 sideways to follow or mimic the operation of the UAV returning to its initial launch site from some operational location some relatively horizontal distance away. In some embodiments, this intuitive operation may be enhanced by the addition of a graphic 808 in or about the slider indicating the initial launch point or otherwise the home location, such as a stylized helicopter pad indicating that the user has moved the return and land button 804 over.

FIG. 8B depicts a user 402 interacting with the screen 800 of FIG. 8A to land the UAV of FIG. 1A to an original departure location. The user 402 may slide the return and land button 804 in the slider 806. In some embodiments, the user 402 may need to concurrently depress the lock button 802 at the same time or have pressed the lock button 802 before sliding the return and land button 804 to enable the return and land operation. An indicator 810, such as an arrow, may appear once the user presses the return and land button 804 and/or the lock button 802 to indicate the direction to slide the return and land button 804 in the slider 806 to return and land the UAV to where it departed from. The return and land slider 806 may be arranged in a horizontal orientation relative to the screen or display 800. This provides the user 402 with a more intuitive action, namely to return the UAV in a horizontal flight path in which the user is moving the return and land button 804, i.e., horizontally. In some embodiments, this intuitive operation may be enhanced by the addition of a graphic in or about the slider indicating a landing location, or otherwise, such as an image of a helicopter landing pad as an indicator 808 that the user needs to move the return and land button 804 over.

FIG. 9A depicts a visual display screen 900 for the controller of FIG. 1B for landing the UAV of FIG. 1A based on the current location of the UAV. The screen 900 may be the next screen displayed to the user immediately after activation of the land now tab 604. The screen 900 may include a land now activator or button 902 positioned in a slider 904. In order to prevent or limit unintended landing of the UAV, such as by an accidental press of a single land button when handling or storing the controller, some embodiments may require the sliding of the land now button 902 through, or at least substantially through, the length of the slider 904. The required sliding of the button 902 further reduces the potential for an unintended activation. As such, for the user to initiate a land now operation of the UAV from the UAV's mission or operation, the user has to perform a multi-step operation. For example, a two-step operation of first activating the land now tab 604, and then sliding the button 902 on the screen 900 through the slider 904. In some embodiments, there may be a three-step operation of activating the land now tab 604, pressing and/or holding a lock button 906, and then sliding the land now button 902 through the slider 904 to a set location, which may be marked with an indicator 908, such as a flat line for the ground.

The arrangement of the land now slider 904 in a vertical orientation, relative to the screen or display 900, and the indication of a slide direction downward corresponds to the UAV landing at its present location. To land the UAV now, the user may move the button 902 downward to follow or mimic the operation of the UAV landing without any substantial, or further, horizontal movement from its then current location. In some embodiments, this intuitive operation may be enhanced by the addition of a graphic in or about the slider indicating 908 a landing location, such as an image of a stylized flat landing location that the user moves the land now 902 button over. The vertical movement of the land now button 902 and slider 904 distinguishes from the horizontal orientation of the return and land button as slider, as shown in FIGS. 8A-8B. The change in orientation ensures that a user does not accidentally land the UAV at its present location when the user wants the UAV to return to the location from which it launched.

FIG. 9B depicts a user interacting with the screen 900 of FIG. 9A to land the UAV of FIG. 1A at the current location of the UAV. The user 402 may slide the land now button 902 in the slider 904 to effect the landing of the UAV. In some embodiments, the user 402 may need to concurrently depress the lock button 906 at the same time or have pressed the lock button 906 before sliding the land now button 902. An indicator 910, such as an arrow, may appear once the user presses the land now button 902 and/or the lock button 906 to indicate the direction to slide the land now button 902 in the slider 904, to land the UAV at its current location. The land now slider 904 may be arranged in a vertical orientation, relative to the screen or display 900. This provides the user 402 with a more intuitive action, namely to land the UAV in a vertical landing the user is moving the land now button 902 vertically. In some embodiments, this intuitive operation may be enhanced by the addition of a graphic in or about the slider indicating a landing location, or otherwise, such as an image of a flat ground as an indicator 908 that the user is moving the land now button 902 over.

FIG. 10A depicts a visual display screen 1000 for the controller of FIG. 1B for effecting an emergency stop of the UAV of FIG. 1A. The screen 1000 may be the next screen displayed to the user immediately after activation of the emergency stop tab 602. The screen 1000 may include an emergency stop activator or button 1002 positioned in a slider 1004. In order to prevent or limit an unintended emergency stop of the UAV, such as by an accidental press of a single land button when handling or storing the controller, some embodiments may require the sliding of the emergency land button 1002 through, or at least substantially through, the length of the slider 1004. The required sliding of the button 1002 further reduces the potential for an unintended activation. As such, for the user to initiate an emergency stop operation of the UAV from the UAV's mission or operation, the user has to perform a two-step operation of first activating the emergency stop tab 602 and then on screen 1000 sliding the button 1002 through the slider 1004. In some embodiments, there may be a three-step operation of activating the emergency stop tab 602, pressing and/or holding a lock button 1006, and then sliding the emergency stop button 1002 through the slider 1004 to a set location, which may be marked with an indicator 1008, such as a flat line for the ground.

The arrangement of the emergency stop slider 1004 in a vertical orientation, relative to the screen or display 1008, and the indication of a slide direction downward may correspond to the UAV stopping and falling to the ground at its present location. To enact an emergency stop of the UAV, the user is showing in the figure as moving the button 1002 downward to follow or mimic the operation of the UAV falling to the ground without any substantial, or further, horizontal movement from its then current location. In some embodiments, this intuitive operation may be enhanced by the addition of a graphic in or about the slider indicating 1008 a landing location, such as an image of a stylized flat landing location that the user moves the emergency stop button 1002 over. The vertical movement of the emergency stop button 1002 and slider 1004 distinguishes from the horizontal orientation of the return and land button as slider, as shown in FIGS. 8A-8B. The change in orientation ensures that a user does not accidentally land the UAV at its present location when the user wants the UAV to return to the location from which it launched. The emergency stop button 1002 and slider 1004 may be distinguished from the land now button and slider, as shown in FIGS. 9A-9B, by, for example, additional warnings, color coding of the screens, a visual warning, etc. While the land now button acts to vertically land the UAV in its present location, the emergency stop button 1002 and slider 1004 act to cut power to the UAV, which may cause damage or complete loss of the UAV. The emergency stop capability may be necessary in instances where the UAV has encountered a severe fault, is out of control, or other scenarios where the emergency stop is necessitated.

FIG. 10B depicts a user 402 interacting with the screen 1000 of FIG. 10A to effect the emergency stop of the UAV of FIG. 1A. The user 402 is shown sliding the emergency stop button 1002 in the slider 1004. In some embodiments, the user 402 may need to concurrently depress the lock button 1006 at the same time or have pressed the lock button 1006 before sliding the emergency stop button 1002. An indicator 1010, such as an arrow, may appear once the user presses the emergency stop button 1002 and/or the lock button 1006 to indicate the direction to slide the emergency stop button 1002 in the slider 1004 to cut power to the UAV motors at its current location. The emergency stop slider 1004 is arranged in a vertical orientation, relative to the screen or display 1000. This provides the user 402 with a more intuitive action, namely to cause the UAV to fall out of the air in an emergency stop the user is moving the emergency stop button 1002 vertically. In some embodiments, this intuitive operation may be enhanced by the addition of a graphic in or about the slider indicating a landing location, or otherwise, such as an image of a flat ground as an indicator 1008 that the user moves the emergency stop button 1002 over.

Figure 11:
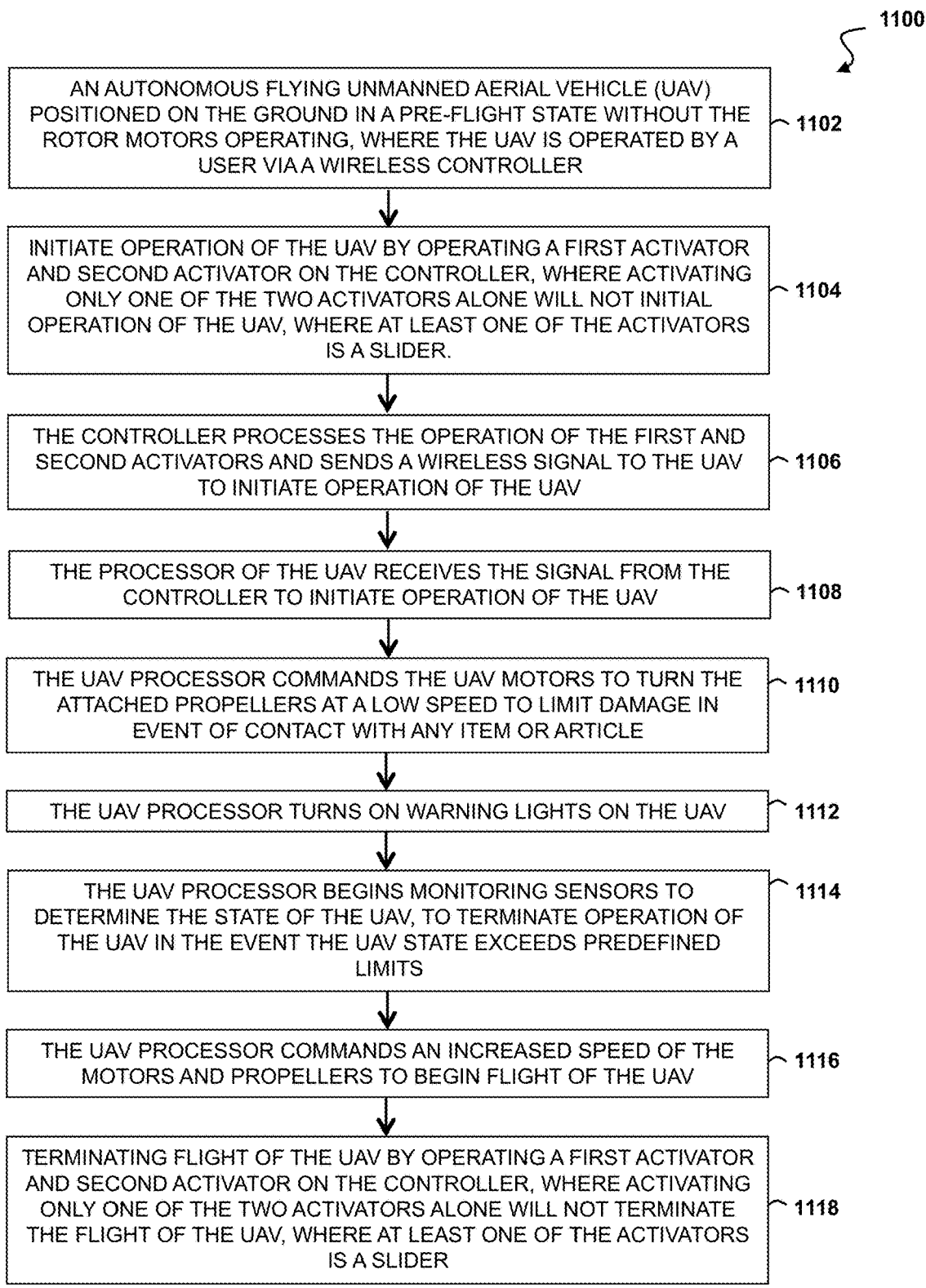
FIG. 11 depicts a flowchart of a method of operating the UAV of FIG. 1A with a safety system via the controller of FIG. 1B.

FIG. 11 depicts a flowchart of a method 1100 of operating the UAV of FIG. 1A with a safety system via the controller of FIG. 1B. An autonomous flying UAV, such as in FIG. 1A, may be positioned on the ground in a pre-flight state without the rotor motors operating (step 1102). The UAV may be operated by a user via a wireless controller, such as the controller of FIG. 1B. The UAV may initiate operation by the user operating a first activator and second activator on the controller (step 1104). In one embodiment, activating only one of the two activators alone will not initiate operation of the UAV. In other embodiments, at least one of the activators may be a slider. In some embodiments, multiple activators, for example, three activators may be required: selecting a launch tab, pressing and/or holding a lock button, and sliding a button in a slider. The controller may process the operation of the first activator, second activator, and optionally third activator, and send a wireless signal to the UAV to initiate operation of the UAV (step 1106). The processor of the UAV may receive the signal from the controller to initiate operation of the UAV to execute the command (step 1108).

The UAV processor may then command the UAV motors to turn the attached propellers at a low speed to limit damage in the event of contact with any object or article (step 1110). The slow start-up of the rotors may also provide a warning to the user and/or any individuals near the UAV that the UAV is about to launch and that they should move a safe distance from the UAV. In some embodiment, the speed of the propellers may be adjusted during this warning step, where the speed may vary depending on the distance of the controller to the UAV. That is, the system including the UAV and speed of any propeller thereof, may be adjusted during this operation, to be sufficient to warn any person in the vicinity of the UAV. This warning may occur prior to, subsequent to, or simultaneously with the warning lights (step 1112) or monitoring sensors (step 1114). The UAV processor may then turn on warning lights on the UAV (step 1112).

The UAV processor may begin monitoring sensors to determine the state of the UAV, to terminate operation of the UAV in the event the UAV state exceeds predefined limits (step 1114). This monitoring may include operational hazards, unsafe conditions, or crash detection monitoring. The UAV state monitor may include the use of any of a variety of sensors, such as gyroscopes, accelerometers, pressure sensors, Inertial Measurement Unit (IMU), Inertial Navigation System (INS), compasses, global positioning satellite (GPS) units, optical (visual flow) sensors, radar, sonic sensors, battery energy estimates, servo actuator current, motor current, data quality, and the like. The measurements from such sensors are then tracked and compared by the UAV's processor against a set of limits or other values to determine if the UAV is properly positioned to maintain and continue the flight. In the event that the UAV state monitor determines that the UAV has, or is going to, surpass a set of defined limits, then the UAV processor may terminate the flight to maintain or maximize safe operations. In addition to sensor values, the UAV's processor is able to compare derived values for the aircraft health data against what is required for the flight. In one embodiment, the UAV processor may verify that the aircraft battery is reporting sufficient battery energy to execute the planned mission, where the processor may be configured to monitor a variable energy threshold based on the size of the planned mission area and hence against the required battery energy. For example, the battery level may not support completion of the current planned mission and therefore, the UAV processor may redirect the UAV in a different route to achieve as much of the planned mission as possible, this being based on the battery level left and prior usage of the battery in the same mission. Accordingly, by use of previous information and state of the UAV system, a hysteresis system may be implemented where a current state of the system and output is not a strict function of the corresponding input, but also depends on the previously collected data.

The UAV processor may then command an increased speed of the motors and propellers to begin flight of the UAV (step 1116). If needed, the flight may be terminated by operating a first activator and a second activator on the controller (step 1118). Activating only one of the two activators alone may not terminate the flight of the UAV. At least one of the activators may be a slider. In some embodiments, three activators may be required, e.g., selecting a flight termination tab, pressing and/or holding a lock button, and sliding a button in a slider.

Figure 12:
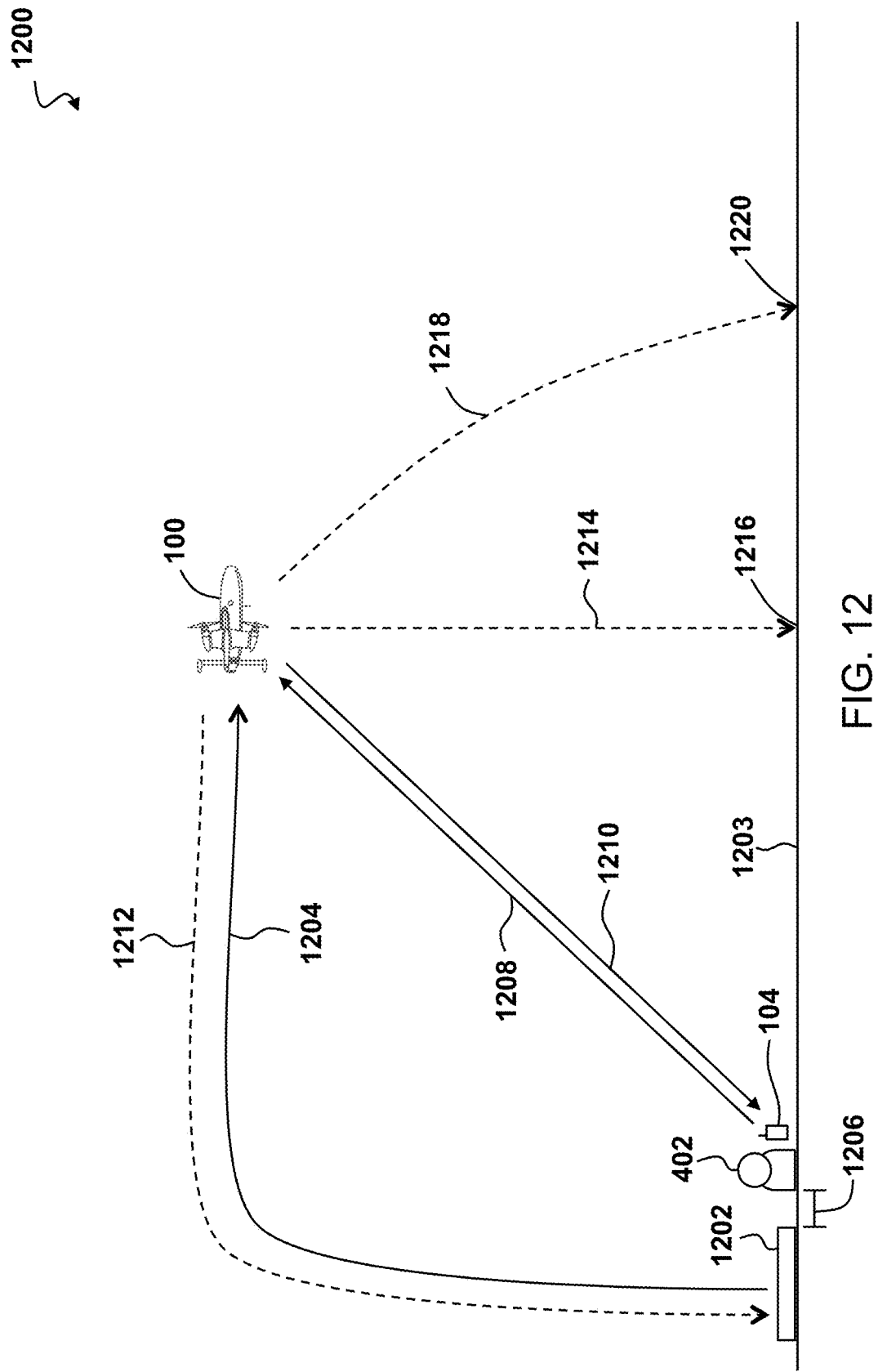
FIG. 12 depicts an exemplary safety system for the UAV of FIG. 1A.

FIG. 12 depicts an exemplary safety system 1200 for the UAV 100 of FIG. 1A. The UAV may start from a launch location 1202 on the ground 1203. The launch location 1202 may be a UAV pod that provides battery charging for the UAV 100 and/or data transfer from the UAV following a mission. The UAV 100 may follow a flight path 1204 from vertical take-off to horizontal flight. The UAV 100 may use horizontal flight to maximize flight time and the area that may be imaged by one or more sensors on the UAV 100. The user 402 may use the controller 104 to monitor and control the UAV 100.

The user 402 may initiate a vertical launch of the UAV 100 by two or more activators on the controller 104, as in FIGS. 4A-4B. The user may select a launch window, press or hold a lock button, and slide a launch button in a slider to launch the UAV 100. The launch button may be slid vertically upwards relative to the screen of the controller to match the vertical take-off of the UAV 100. By using at least two separate activators, the user 402 may avoid an accidental launch of the UAV 100. Prior to launch, the UAV 100 may emit one or more warnings, such as indicator lights as shown in FIG. 1C, an audible warning from a speaker, the motors, or the controller, and/or an initial slow turning of the rotors or propellers of the UAV 100. Since the user 402 may need to be positioned a safe distance 1206 from the UAV launch location 1206, the one or more warnings prior to launch may ensure that the user 402 or any other individuals are not too close to the UAV 100 at launch. If the user 402 or any other individual is too close to the UAV 100, the warnings provide time to move a safe distance away and/or to terminate the launch.

Once the UAV is in flight, the user 402 may send one or more flight termination commands 1208 to the UAV 100 via the controller 104. The UAV 100 may send data 1210 to the controller 104 during flight. The UAV data may include sensed information, UAV status, any errors or faults, time to land, sensor status, location of the UAV, etc. In one embodiment, the UAV 100 may determine a wind speed and/or direction by launching vertically, hovering, and calculating a wind speed and/or direction based on the movement of the UAV 100 relative to the ground 1203 and/or launch location 1202 while hovering. The UAV 100 may use this calculated wind speed and/or direction to determine an optimized flight path 1204 and/or determine a time to land. In one embodiment, the UAV may send a signal to the controller indicating that based on the UAV processor calculations, the current flight path may not be achievable and accordingly, request that a user at the controller initiate a land now or return and land action.

A processor of the UAV 100 may continuously calculate the energy required to return to and land 1212 on the launch location 1202. The processor may also continuously calculate the energy required to perform a land now 1214 operation at its current location. If the processor determines that the UAV 100 has just enough battery to return and land 1212, the processor may cause the UAV to abort the present mission and return and land 1212 at its launch location 1202. In one embodiment, the need to return and land 1212 may occur if there are high winds and the UAV is using more energy than anticipated to fly through its flight path 1204. The user 402 may also command the UAV 100 to return and land 1212 via the controller 104 by using two or more activators, such as selecting a tab, pressing or holding a lock button, and sliding a button in a slider. The user 402 may enact a return and land 1212 command via the controller 104 if the user 402 detects a fault, wants the UAV 100 to land, observes a negative change in the weather such as thunderstorms, etc. The return and land 1212 command returns the UAV 100 to its launching location 1202 for landing, with no damage to the UAV 100 or objects in the surrounding area. In some embodiments, the UAV 100 may enact an automated return and land 1212 if it detects a fault or error that does not carry a risk of returning to the launch location 1202, such as a malfunction or obscuration of a visual sensor used to gather data 1210.

In one embodiment, in response to a request from the UAV processor to end the current flight, the user may select a return and land tab, as in FIGS. 8A-8B, press or hold a lock button, and slide a return and land button in a slider to return and land 1212 the UAV 100. The return and land button may be slid horizontally relative to the screen of the controller to match the horizontal movement of the UAV 100 to the launch location 1202. By using at least two separate activators, the user 402 may avoid an accidental return and land 1212 of the UAV 100.

If the processor of the UAV 100 determines that the UAV 100 does not have enough battery to return and land 1212, the processor may enact a land now 1214 in which the UAV 100 will land at a location 1216 on the ground 1203 near its present location, i.e., the UAV 100 may transition from horizontal flight to vertical flight to land. This land now 1214 ensures that the UAV 100 does not run out of battery and fall to the ground, which may result in damage to the UAV 100 or objects in the surrounding area. In some embodiments, the UAV 100 processor may enact an automated land now 1214 operation if it encounters a fault that would not allow for a safe return and land 1212, such as a loss of GPS connection leading to not having location data information for the UAV. In this exemplary scenario, if the UAV 100 loses GPS it may not be able to safely navigate and so the processor may automatically cause the UAV 100 to land now 1214.

The user 402 may enact the land now 1214 command via the controller 104 if the user 402 detects a fault, wants the UAV 100 to land, observes a negative change in the weather such as thunderstorms, etc. The user 402 may observe the area over which the UAV is flying to determine whether a land now 1214 is safe for the UAV 100 and any objects on the ground 1203 in the location 1216 under the UAV 100. The land now 1214 command returns the UAV 100 to the ground 1203 with no damage to the UAV 100 or surrounding area as long as there is a clear path to the location 1216 on the ground 1203 that the UAV will land on.

The user may select a land now tab, as in FIGS. 9A-9B, press or hold a lock button, and slide a return and land button in a slider to land now 1214. The land now button may be slid vertically from top to bottom relative to the screen of the controller to match the vertical downward movement of the UAV 100 to the landing location 1216 on the ground 1203. By using at least two separate activators, the user 402 may avoid an accidental land now 1214 of the UAV 100.

The user 402 may enact an emergency stop 1218 command via the controller 104 if the user 402 detects a fault and/or needs the UAV 100 to stop flight immediately. The emergency stop 1218 command may cut power to one or more motors of the UAV 100, which may cause the UAV 100 to crash at a location 1220 on the ground. Due to the momentum in horizontal flight, in some embodiments, the option to enact an emergency stop 1218 may only be available to a user 402 on the controller 104 when the UAV 100 is hovering or in vertical flight, so as to prevent landing in an undesired location. The emergency stop 1218 may result in a loss of the UAV 100 as it crashes to the ground 1203.

The user may select an emergency land tab, as in FIGS. 10A-10B, press or hold a lock button, and slide an emergency land button in a slider to emergency stop 1218. The emergency stop button may be slid vertically from top to bottom relative to the screen of the controller to match the vertical downward movement of the UAV 100 to the landing location 1220 on the ground 1203. By using at least two separate activators, the user 402 may avoid an accidental emergency land 128 of the UAV 100.

FIG. 13 illustrates an exemplary top level functional block diagram of a computing device embodiment 1300 of a safety system, such as controller 104 of FIG. 1B, and/or one or more VTOL UAV, such as VTOL UAV 100 of FIG. 1A. The exemplary embodiment 1300 is shown as a computing device 1320 having a processor 1324, such as a central processing unit (CPU), addressable memory 1327, an external device interface 1326, e.g., an optional universal serial bus port and related processing, and/or an Ethernet port and related processing, and an optional user interface 1329 (See FIGS. 4A-4B, 6, and 8A-10B), e.g., an array of status lights and one or more toggle switches, and/or a display, and/or a keyboard and/or a pointer-mouse system and/or a touch screen. Optionally, the addressable memory 1327 may for example be: flash memory, eprom, and/or a disk drive or other hard drive. These elements may be in communication with one another via a data bus 1328. The processor 1324 may have an operating system 1325 such as one supporting a web browser 1323 and/or applications 1322, which may be configured to execute steps of a process according to the exemplary embodiments described herein.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A system for operation of an unmanned aerial vehicle (UAV) comprising:
   a UAV having a processor and addressable memory, the processor configured to:
   determine a remaining battery state of charge needed by the UAV to return to and land at a launch location based on a location of the UAV determined by at least one sensor;
   command the UAV to return to and land on the launch location if the determined remaining battery state of charge is within a set limit; and
   command the UAV to return to and land on the launch location if a first activator and a second activator on a display of a controller are selected simultaneously.

2. The system of claim 1 wherein the processor is further configured to:
   command the UAV to land now at the UAV current location if the determined remaining battery state of charge is under a set limit for returning and landing at the launch location.

3. The system of claim 1 wherein the processor is further configured to:
   determine if a fault condition has occurred.

4. The system of claim 3 wherein the processor is further configured to:
   command the UAV to return to and land on the launch location and land now at the UAV current location.

5. The system of claim 3 wherein the processor is further configured to:
   command the UAV to land now at the UAV current location.

6. A method for operation of an unmanned aerial vehicle (UAV) comprising:
   presenting a first activator and a second activator on a display of a controller, the controller comprising a first processor with addressable memory, wherein the second activator is a slider;
   generating a UAV command for a UAV based on a direction of movement of a button in the slider of the second activator, wherein the direction of movement corresponds to an action of the UAV; and
   transmitting a UAV command to the UAV via a transmitter of the controller if the first activator and the second activator are selected, the UAV comprising a second processor with addressable memory and a receiver configured to receive the transmitted command.

7. The method of claim 6 wherein the direction of movement of the button in the slider of the second activator is horizontal relative to a display of the controller, and wherein the generated UAV command is a return and land command.

8. The method of claim 7 wherein the return and land command directs the UAV to land at a location it launched from.

9. The method of claim 8 further comprising:
   receiving, by the UAV, the return and land UAV command; and
   executing the received return and land UAV command on the UAV, wherein the executed return and land UAV command comprises a substantially horizontal movement of the UAV from a current location of the UAV.

10. The method of claim 6 wherein the direction of movement of the button in the slider of the second activator is vertical and downward relative to a display of the controller, and wherein the generated UAV command is a land now command.

11. The method of claim 10 wherein the land now command directs the UAV to land at a location proximate to a geographical position of the UAV when the UAV receives the land now command.

12. The method of claim 11 further comprising:
receiving, by the UAV, the land now UAV command; and
executing the received land now UAV command on the UAV, wherein the executed land now UAV command comprises a substantially vertical and downward movement of the UAV from a current location of the UAV.

13. The method of claim 6 wherein the direction of movement of the button in the slider of the second activator is vertical and downward relative to a display of the controller, and wherein the generated UAV command is an emergency stop command.

14. The method of claim 13 wherein the emergency stop command directs the UAV to stop at least one motor of the UAV.

15. The method of claim 14 further comprising:
receiving, by the UAV, the emergency stop UAV command; and
executing the received emergency stop UAV command on the UAV, wherein the executed emergency stop UAV command comprises a substantially vertical and downward movement of the UAV from a current location of the UAV.

16. The method of claim 6 wherein the direction of movement of the button in the slider of the second activator is vertical and upward relative to a display of the controller, and wherein the generated UAV command is a launch command.

17. The method of claim 16 wherein the launch command directs the UAV to launch from a current location when the UAV receives the launch command.

18. The method of claim 17 further comprising:
receiving, by the UAV, the launch UAV command; and
executing the received launch UAV command on the UAV, wherein the executed launch UAV command comprises a substantially vertical and upward movement of the UAV from the current location of the UAV.

19. A system for operation of an unmanned aerial vehicle (UAV) comprising:
a controller having a processor and addressable memory, wherein the controller is configured to:
present a first activator and a second activator on a display of a controller, the controller comprising a first processor with addressable memory, wherein the second activator is a slider;
generate a UAV command for a UAV based on a direction of movement of a button in the slider of the second activator, wherein the direction of movement corresponds to an action of the UAV; and
transmit a UAV command to the UAV via a transmitter of the controller if the first activator and the second activator are selected, the UAV comprising a second processor with addressable memory and a receiver configured to receive the transmitted command.

20. The system of claim 19 further comprising:
the UAV having a processor and addressable memory, the UAV processor configured to:
receive the UAV command; and
executing the received UAV command on the UAV, wherein the executed UAV command comprises a direction of movement of the UAV corresponding to the direction of movement of the button in the slider of the second activator.

* * * * *